(12) United States Patent
Marsh et al.

(10) Patent No.: US 10,644,992 B2
(45) Date of Patent: *May 5, 2020

(54) CASCADED REDUNDANCY ARCHITECTURES FOR COMMUNICATION SYSTEMS

(71) Applicant: The Boeing Company, Chicago, IL (US)

(72) Inventors: Kyle T. Marsh, Redondo Beach, CA (US); Stephen A. MacAnlis, El Segundo, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,908

(22) Filed: Jul. 22, 2019

(65) Prior Publication Data

US 2019/0349291 A1 Nov. 14, 2019

Related U.S. Application Data

(63) Continuation of application No. 15/288,831, filed on Oct. 7, 2016, now Pat. No. 10,382,320.

(51) Int. Cl.
 *H04B 7/185* (2006.01)
 *H04L 12/703* (2013.01)
 *H04L 12/707* (2013.01)

(52) U.S. Cl.
 CPC ......... *H04L 45/28* (2013.01); *H04B 7/18515* (2013.01); *H04L 45/22* (2013.01); *H04L 45/24* (2013.01)

(58) Field of Classification Search
 CPC ..... H04B 7/18515; H04L 45/22; H04L 45/24; H04L 45/28
 (Continued)

(56) References Cited

U.S. PATENT DOCUMENTS 6,301,225 B1 * 10/2001 Murdock ................. H03F 3/58
 333/101
10,027,296 B2 * 7/2018 Gonzalez Esteban ......................
 H03F 1/0277

(Continued)

OTHER PUBLICATIONS

Non-Final Office Action for U.S. Appl. No. 15/288,831 dated Nov. 14, 2018.

(Continued)

*Primary Examiner* — Melvin C Marcelo
*Assistant Examiner* — Natali Pascual Peguero
(74) *Attorney, Agent, or Firm* — McDonnell Boehnen Hulbert & Berghoff LLP

(57) ABSTRACT

An example redundancy architecture is described that includes a plurality of nominal RF paths, a plurality of spare input RF paths, a controllable input switching system, a plurality of spare output RF paths, and a controllable output switching system. The controllable input switching system is configured to selectively link any one of the plurality of spare input RF paths to any one of the plurality of nominal RF paths while avoiding disruption of service on the other nominal RF paths. In addition, the controllable output switching system is configured to selectively link any one of the plurality of nominal RF paths to any one of the plurality of spare output RF paths while avoiding disruption of service on the other nominal RF paths.

20 Claims, 9 Drawing Sheets

(58) Field of Classification Search
USPC .................................. 370/225, 227, 228
See application file for complete search history.

(56) References Cited

U.S. PATENT DOCUMENTS

| | | |
|---|---|---|
| 2003/0134593 A1 | 7/2003 | DiCamillo et al. |
| 2018/0102967 A1 | 4/2018 | Marsh et al. |

OTHER PUBLICATIONS

Notice of Allowance for U.S. Appl. No. 15/288,831 dated Apr. 3, 2019.

* cited by examiner

1100

```
┌─────────────────────────────────────────────────┐
│  RECEIVING A RECONFIGURATION COMMAND TO LINK A  │
│  PARTICULAR ONE OF THE PLURALITY OF NOMINAL RF  │──1102
│  PATHS TO A PARTICULAR ONE OF THE PLURALITY OF  │
│           SPARE OUTPUT RF PATHS                 │
└─────────────────────────────────────────────────┘
                       │
                       ▼
┌─────────────────────────────────────────────────┐
│  RESPONSIVE TO RECEIVING THE RECONFIGURATION    │
│  COMMAND, LINKING THE PARTICULAR NOMINAL RF     │──1104
│  PATH TO THE PARTICULAR SPARE OUTPUT RF PATH    │
│  WITHOUT DISRUPTING SERVICE ON THE OTHER        │
│  NOMINAL RF PATHS                               │
└─────────────────────────────────────────────────┘
```

FIG. 11

```
┌─────────────────────────────────────────────────┐
│  RECEIVING A SERIAL COMMAND THAT IS ADDRESSED   │
│  TO ONE OR MORE OF THE MULTIPLE INDIVIDUALLY    │──1202
│           CONTROLLABLE SWITCHES                 │
└─────────────────────────────────────────────────┘
                       │
                       ▼
┌─────────────────────────────────────────────────┐
│  SWITCHING A STATE OF THE ONE OR MORE OF THE    │
│  MULTIPLE INDIVIDUALLY CONTROLLABLE SWITCHES    │
│  TO ALLOW THE PRIMARY RF SIGNAL OF THE          │
│  PARTICULAR NOMINAL RF PATH TO TRAVEL FROM THE  │──1204
│  PARTICULAR NOMINAL RF PATH TO THE PARTICULAR   │
│  SPARE OUTPUT RF PATH THROUGH THE               │
│  CONTROLLABLE SWITCHING SYSTEM                  │
└─────────────────────────────────────────────────┘
```

FIG. 12

CASCADED REDUNDANCY ARCHITECTURES FOR COMMUNICATION SYSTEMS

CROSS-REFERENCE TO RELATED APPLICATIONS

The present application is a continuation of U.S. patent application Ser. No. 15/288,831, filed Oct. 7, 2016, entitled "CASCADED REDUNDANCY ARCHITECTURES FOR COMMUNICATION SYSTEMS," the entire contents of which are hereby incorporated by reference.

FIELD

The present disclosure relates generally to redundancy switching, and more particularly, to redundancy switching for communication systems.

BACKGROUND

Many satellite communication systems are designed to operate for many years. In order to maintain reliability and prolong the working life of a satellite payload, the payload may be equipped with spare or redundant units that are designed to be switched into a signal path when a primary unit fails. By way of example, a payload may include ten primary low-noise amplifiers and two spare low-noise amplifiers. When one of the primary low-noise amplifiers fails, one of the two spare low-noise amplifiers may be switched into a signal path of the failed low-noise amplifier.

Switching a spare unit into the signal path of a failed primary unit may involve sending a radio frequency (RF) command to an electromechanical switch. For instance, the electromechanical switch may have two positions: in a first position, the electromechanical switch may link a primary unit to a signal path; and in a second position, the electromechanical switch may link a spare unit to the signal path. If the primary unit fails, an RF command may be sent to the electromechanical switch, causing the switch to transition to the second position.

When multiple primary units and multiple spare units are included, a redundancy ring may be used to allow for replacing a primary unit with a spare unit. FIG. 1 conceptually illustrates an example configuration of part of a conventional communications satellite payload. As shown in FIG. 1, the communications satellite payload may include an input redundancy ring switch 102 that connects a plurality of input paths 104 to a plurality of nominal paths 106. The plurality of input paths 104 includes four primary input paths and two spare input paths. Each of the four primary input paths may lead to a corresponding primary input unit and each of the two spare input paths may lead to a corresponding spare input unit. The input redundancy ring switch 102 may include six switches, each of which can be positioned in a nominal position, an up position, or a down position. Initially, the six switches may each be positioned in the nominal position, such that a first switch S1 links "input 1" to "nominal path 1", a second switch S2 links "input path 2" to "nominal path 2", and so forth. As further shown in FIG. 1, the communications satellite payload may also include an output redundancy ring switch 110 that connects the plurality of nominal paths 106 to a plurality of output paths 112.

In operation, when one or more primary input units fail, individual switches of the input redundancy ring switch 102 are shuffled up or down to switch signals from the spare units into the plurality of nominal paths. For example, as shown in FIG. 2, a fourth switch S4 and a fifth switch S5 may be switched to the up position, such that "input 4" is switched into "nominal path 3" and "spare 1" is switched into "nominal path 4". In addition, the first switch S1 and a sixth switch S6 may be switched to the down position, such that "input 1" is switched into "nominal path 2" and "spare 2" is switched into "nominal path 1".

When using a redundancy ring switch, such as the input redundancy ring switch 102 of FIGS. 1 and 2, the individual switches are controlled using special commands. In particular, the individual switches are controlled individually by sending high voltage pulses to the switches, with the pulse causing the switch to transition to a different position.

Moreover, when shuffling the switches of a redundancy ring switch to switch a spare path into a nominal path, a disruption of service occurs on other nominal paths. For instance, as discussed above, when replacing "input 2" and "input 3", disruption occurs on not only "nominal path 2" and "nominal path 3", but also "nominal path 1" and "nominal path 4". Specifically, "nominal path 1" is disrupted when "input 1" is switched to "nominal path 2", and "nominal path 4" is disrupted when "input 4" is switched to "nominal path 3".

In addition, individual switches of a redundancy ring switch can block each other, limiting the number of spare input paths that can be switched in. For example, referring back to FIG. 2, even if the input satellite payload included a third spare between "spare 1" and "spare 2" (not shown) and the input redundancy ring switch 102 included a corresponding seventh switch between the fifth switch S5 and the sixth switch S6 (not shown), the input redundancy ring switch 102 would be unable to switch the third spare into any of the plurality of nominal paths 106. This is because the switches adjacent to the seventh switch could not be shuffled up or down any further. This problem could be remedied by adding many more switches to the redundancy ring (e.g., adding a pair of switches every two nominal paths). However, adding more switches to a redundancy ring switch is costly and increases the weight of the payload.

SUMMARY

In one example, a redundancy architecture for a communications system is described. The redundancy architecture includes a plurality of nominal RF paths, each of the plurality of nominal RF paths configured to carry a respective primary RF signal from a respective primary input port to a respective primary output port. The redundancy architecture also includes a plurality of spare input RF paths, each of the plurality of spare input RF paths configured to receive a respective spare RF signal from a respective spare input port. The redundancy architecture further includes a controllable input switching system configured to selectively link any one of the plurality of spare input RF paths to any one of the plurality of nominal RF paths while avoiding disruption of service on the other nominal RF paths. In addition, the redundancy architecture includes a plurality of spare output RF paths, each of the plurality of spare output RF paths linked to a respective spare output port. And the redundancy architecture includes a controllable output switching system configured to selectively link any one of the plurality of nominal RF paths to any one of the plurality of spare output RF paths while avoiding disruption of service on the other nominal RF paths.

In another example, a method for injecting a spare input path signal into a nominal RF path in a communications system is described. The communications system includes a plurality of nominal RF paths configured to carry a respective primary RF signal from a respective primary input port to a respective primary output port. The method includes receiving, by a controllable switching system, a reconfiguration command. The controllable switching system is configured to selectively link any one of a plurality of spare input RF paths to any one of the plurality of nominal RF paths, and the reconfiguration command is a command to link a particular one of the plurality of spare input RF paths to a particular one of the plurality of nominal RF paths. The method also includes, responsive to receiving the reconfiguration command, linking, by the controllable switching system, the particular spare input RF path to the particular nominal RF path without disrupting service on the other nominal RF paths.

In still another example, a method for accessing a spare output RF path in a communications system is described. The communications system includes a plurality of nominal RF paths configured to carry a respective primary RF signal from a respective primary input port to a respective primary output port. The method includes receiving, by a controllable switching system, a reconfiguration command. The controllable switching system is configured to selectively link any one of the plurality of nominal RF paths to any one of a plurality of spare output RF paths, and the reconfiguration command is a command to link a particular one of the plurality of nominal RF paths to a particular one of the plurality of spare output RF paths. The method also includes, responsive to receiving the reconfiguration command, linking, by the controllable switching system, the particular nominal RF path to the particular spare output RF path without disrupting service on the other nominal RF paths.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

FIG. 11 shows a flowchart of another example method, according to an example embodiment.

FIG. 12 shows a flowchart of another example method for use with the method shown in FIG. 11, according to an example embodiment.

DETAILED DESCRIPTION

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are systems and methods for providing redundancy that address the above-mentioned issues. By way of example, a redundancy architecture for a communications system is provided. The redundancy architecture includes a plurality of nominal RF paths, a plurality of spare input RF paths, a controllable input switching system, a plurality of spare output RF paths, and a controllable output switching system. Each of the plurality of nominal RF paths may be configured to carry a respective primary RF signal from a respective primary input port to a respective primary output port. Further, each of the plurality of spare input RF paths is configured to receive a respective spare RF signal from a respective spare input port, and each of the plurality of spare output RF paths is linked to a respective spare output port. In some embodiments, the communications system may be a communications system of a spacecraft, such as a satellite. In other embodiments, the communications system may be a communications system of an aircraft.

Figure 1:
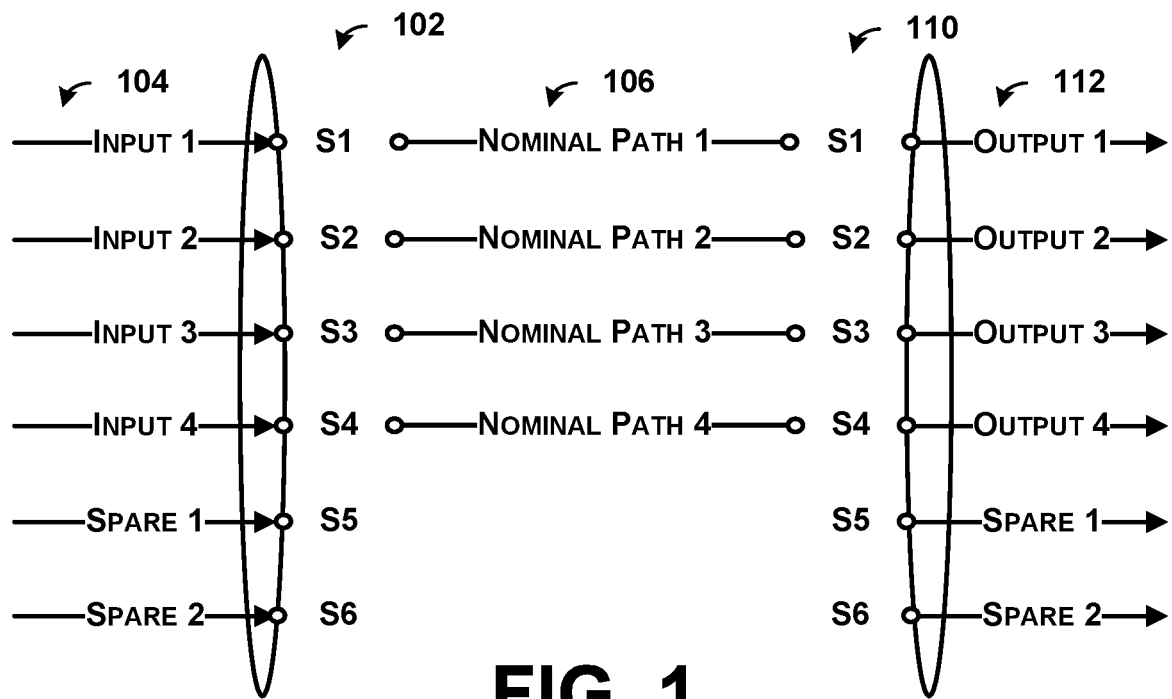
FIGS. 1 and 2 illustrate part of a conventional communications satellite payload.
Figure 2:
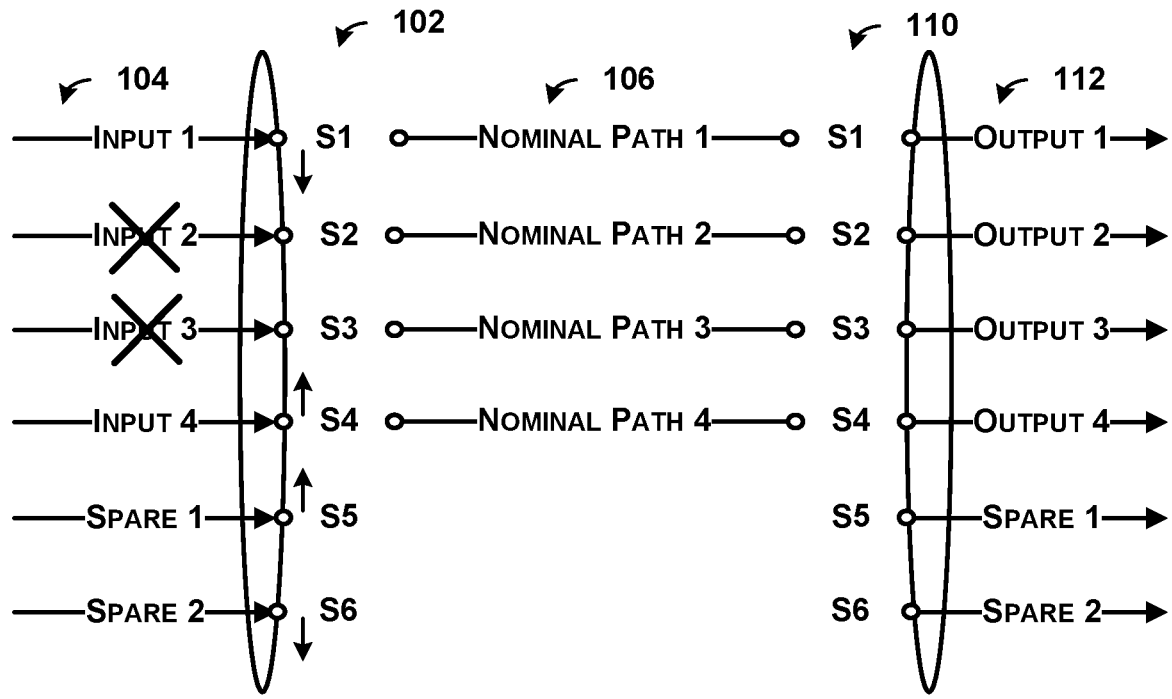

The controllable input switching system is configured to selectively link any one of the plurality of spare input RF paths to any one of the plurality of nominal RF paths while avoiding disruption of service on the other nominal RF paths. Further, the controllable input switching system is configured in a manner that does not suffer from the blocking problem mentioned above with reference to the conventional communications satellite payload of FIGS. 1 and 2; the redundancy architecture is only limited by the number of spare input ports. For instance, if there are ten nominal RF paths and four spare input RF paths, the controllable input switching system can link all of the four spare input RF paths to any of the ten nominal RF paths. And linking one of the spare input RF paths to a particular nominal RF path does not limit the nominal RF paths to which the remaining spare input RF paths can be linked.

Similarly, the controllable output switching system is configured to selectively link any one of the plurality of nominal RF paths to any one of the plurality of spare output RF paths while avoiding disruption of service on the other nominal RF paths. Further, the controllable output switching system is configured in a manner that does not suffer from the blocking problem mentioned above with reference to the conventional communications satellite payload of FIGS. 1 and 2; linking one of the spare output RF paths to a particular nominal RF does not limit the nominal RF paths to which the remaining spare output RF paths can be linked.

Various other features of the systems and methods are also described hereinafter with reference to the accompanying figures.

Figure 3:
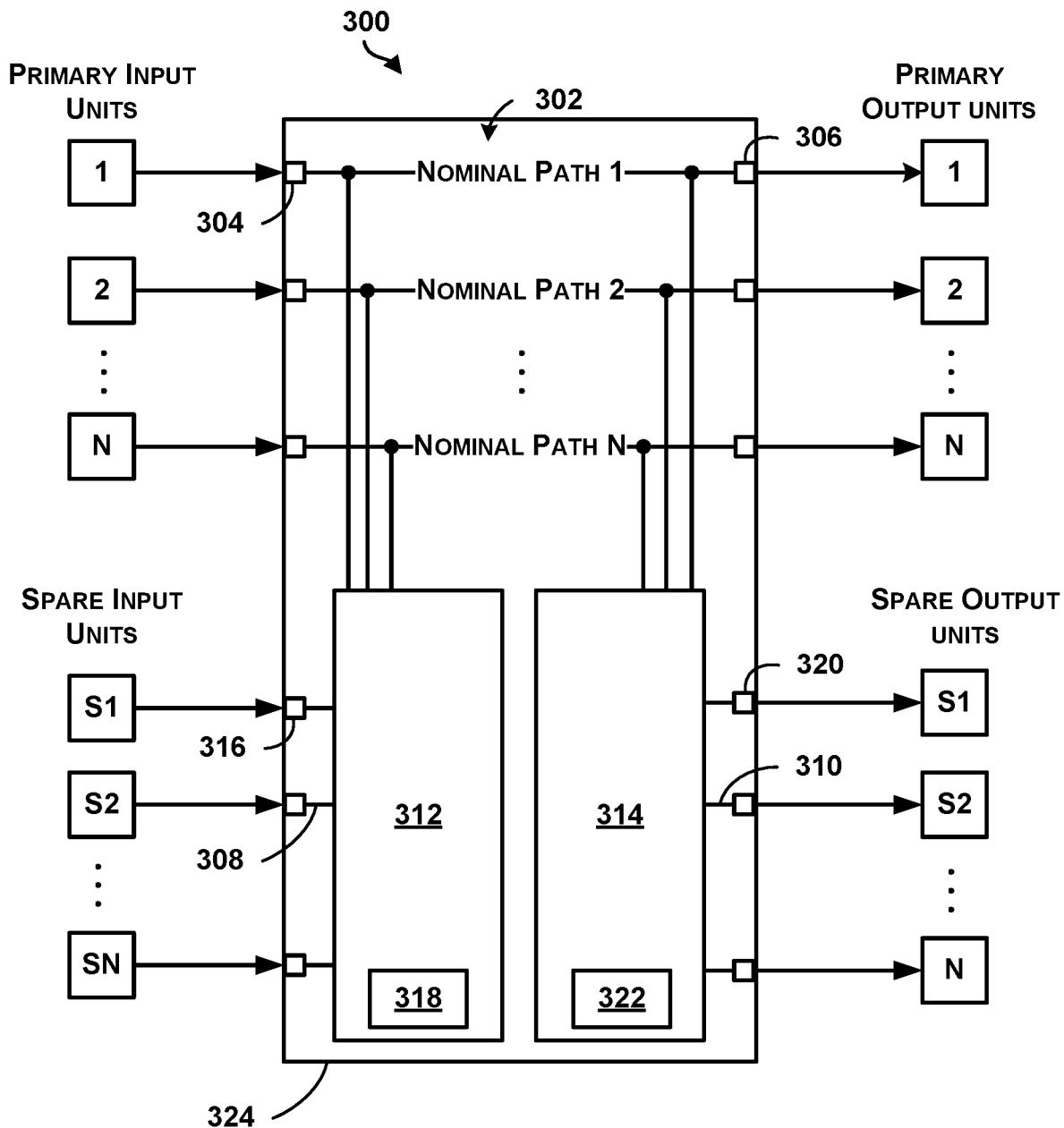
FIG. 3 illustrates an example redundancy architecture for a communications system, according to an example embodiment.

Referring now to FIG. 3, an example redundancy architecture 300 for a communications system is illustrated. The communications system may be a communications system of a spacecraft, such as a communications satellite, a communications system of an aircraft, or another type of communications system. As shown in FIG. 3, the redundancy architecture 300 includes a plurality of nominal RF paths 302. Each of the nominal RF paths is configured to carry a respective primary RF signal from a respective primary input port 304 to a respective primary output port 306.

The primary input ports 304 may serve as interfaces between primary input units and the plurality of nominal RF paths 302. In one example, the primary input units may be low-noise amplifiers (LNAs). More generally, the primary input units may be any type of active unit provided on a communications system. Although each primary input port is shown connected to a corresponding primary input unit, the example is not meant to be limiting. In other examples, multiple primary input ports may be connected to the same primary input unit.

The primary output ports 306 may serve as interfaces between primary output units and the plurality of nominal RF paths 302. The primary output units may also be any type of active unit provided on a communications system. Although each primary output port is shown connected to a corresponding primary output unit, the example is not meant to be limiting. In other examples, multiple primary output ports may be connected to the same primary output unit.

The redundancy architecture 300 also includes a plurality of spare input RF paths 308, a plurality of spare output RF paths 310, a controllable input switching system 312, and a controllable output switching system 314. Further, the plurality of spare input RF paths 308 link a plurality of spare input ports 316 to the controllable input switching system 312. The plurality of spare input ports 316 serve as interfaces between spare input units and the spare input RF paths 308.

The controllable input switching system 312 is configured to link any one of the plurality of spare input RF paths 308 to any one of the plurality of nominal RF paths 302. As discussed more fully below, the controllable input switching system 312 may include a number of individually controllable switches (e.g., relays, solid-state switches, electromechanical switches, etc.). The controllable input switching system 312 also includes a communication interface 318. In one example, the communication interface 318 may be a serial communication interface that is configured to receive serial commands. In practice, the serial communication interface may receive individual commands addressed to individual switches of the controllable input switching system 312. An individual command may be a command to toggle the state of an individual switch.

The plurality of spare output RF paths 310 link a plurality of spare output ports 320 to the controllable output switching system 314. The plurality of spare output ports 320 serve as interfaces between spare output units and the spare output RF paths 310.

The controllable output switching system 314 is configured to link any one of the plurality of nominal RF paths 302 to any one of the spare output RF paths 310. As discussed more fully below, the controllable output switching system 314 may include a number of individually controllable switches (e.g., relays, solid-state switches, electromechanical switches, etc.). The controllable output switching system 314 also includes a communication interface 322. In one example, the communication interface 322 may be a serial communication interface that is configured to receive serial commands. In practice, the serial communication interface may receive individual commands addressed to individual switches of the controllable input switching system 312. An individual command may be a command to toggle the state of an individual switch.

Although the controllable input switching system 312 and the controllable output switching system 314 are depicted as separate components with separate communication interfaces, in other examples, the controllable input switching system 312 and the controllable output switching system 314 may be combined into a single controllable switching system having a single communication interface (not shown). Furthermore, in other examples, the redundancy architecture 300 might not include a controllable input switching system or might not include a controllable output switching system (also not shown).

As illustrated, the redundancy architecture 300 may be contained within a single switchbox 324.

Figure 4:
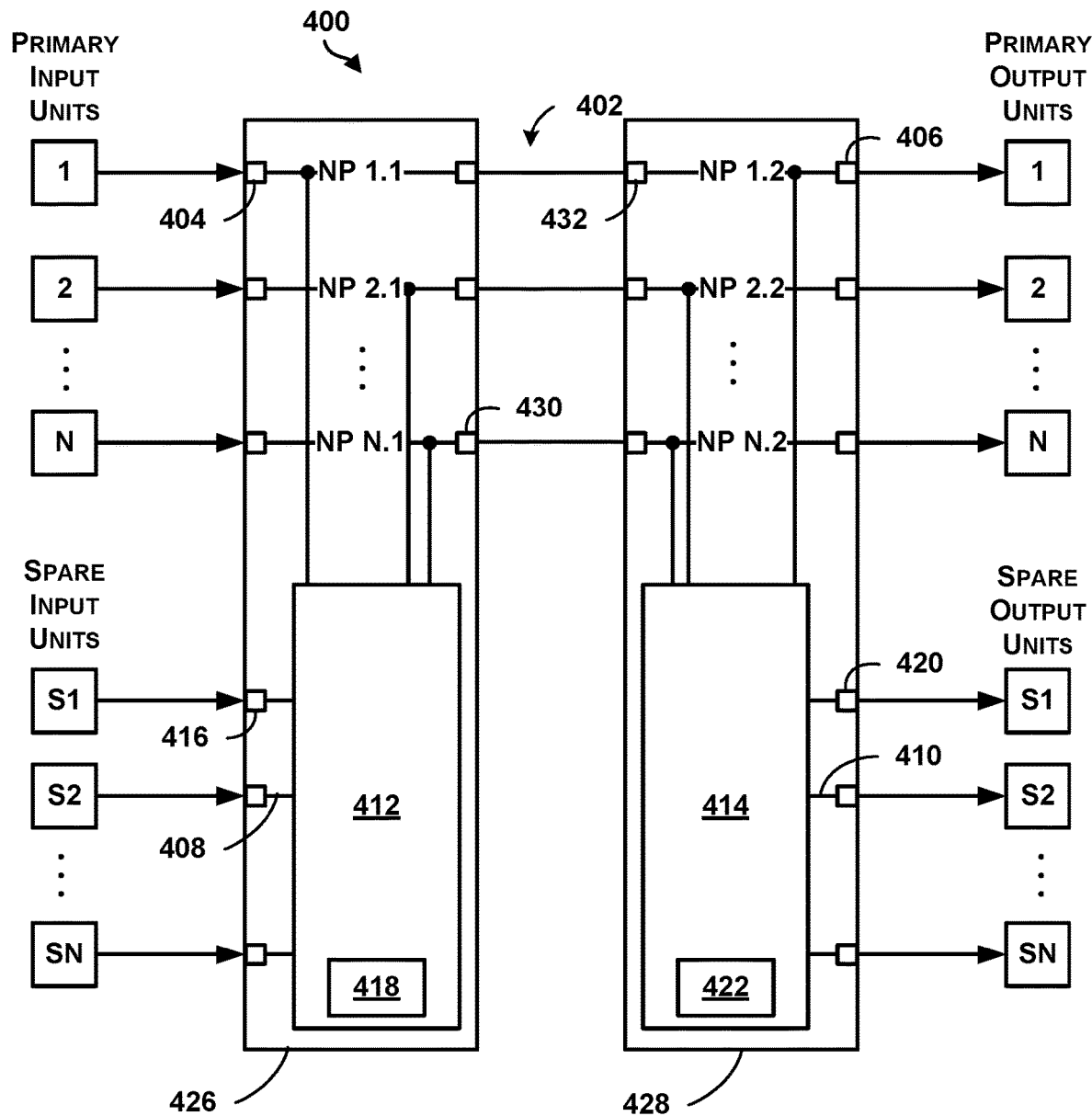
FIG. 4 illustrates another example redundancy architecture for a communications system, according to an example embodiment.

FIG. 4 illustrates another example redundancy architecture 400 for a communications system. The communications system may be a communications system of a spacecraft, such as a communications satellite, a communications system of an aircraft, or another type of communications system. As in the redundancy architecture 300 of FIG. 3, the redundancy architecture 400 includes a plurality of nominal RF paths 402, a plurality of primary input ports 404, a plurality of primary output ports 406, a plurality of spare input RF paths 408, a plurality of spare output RF paths 410, a controllable input switching system 412, a controllable output switching system 414, a plurality of spare input ports 416, and a plurality of spare output ports 420. Further, the controllable input switching system 412 includes a communication interface 418, and the controllable output switching system 414 includes a communication interface 422.

The redundancy architecture 400 differs from the redundancy architecture 300 of FIG. 3 in that the redundancy architecture 400 is contained within two switch boxes: namely, an input switchbox 426 and an output switchbox 428. With this configuration, a first part (i.e., NP1.1, NP 2.1 . . . NP N.1) of each of the nominal RF paths 402 is located within the input switchbox 426 and a second part (i.e., NP 1.2, NP 2.2 . . . NP N.2) of each of the nominal RF paths 402 is located within the output switchbox 428. This configuration facilitates the insertion of passive units in the nominal RF paths 402. For instance, passive units can be inserted between nominal RF path output ports 430 of the input switchbox 426 and nominal RF path input ports 432 of the output switchbox 428.

Figure 5:
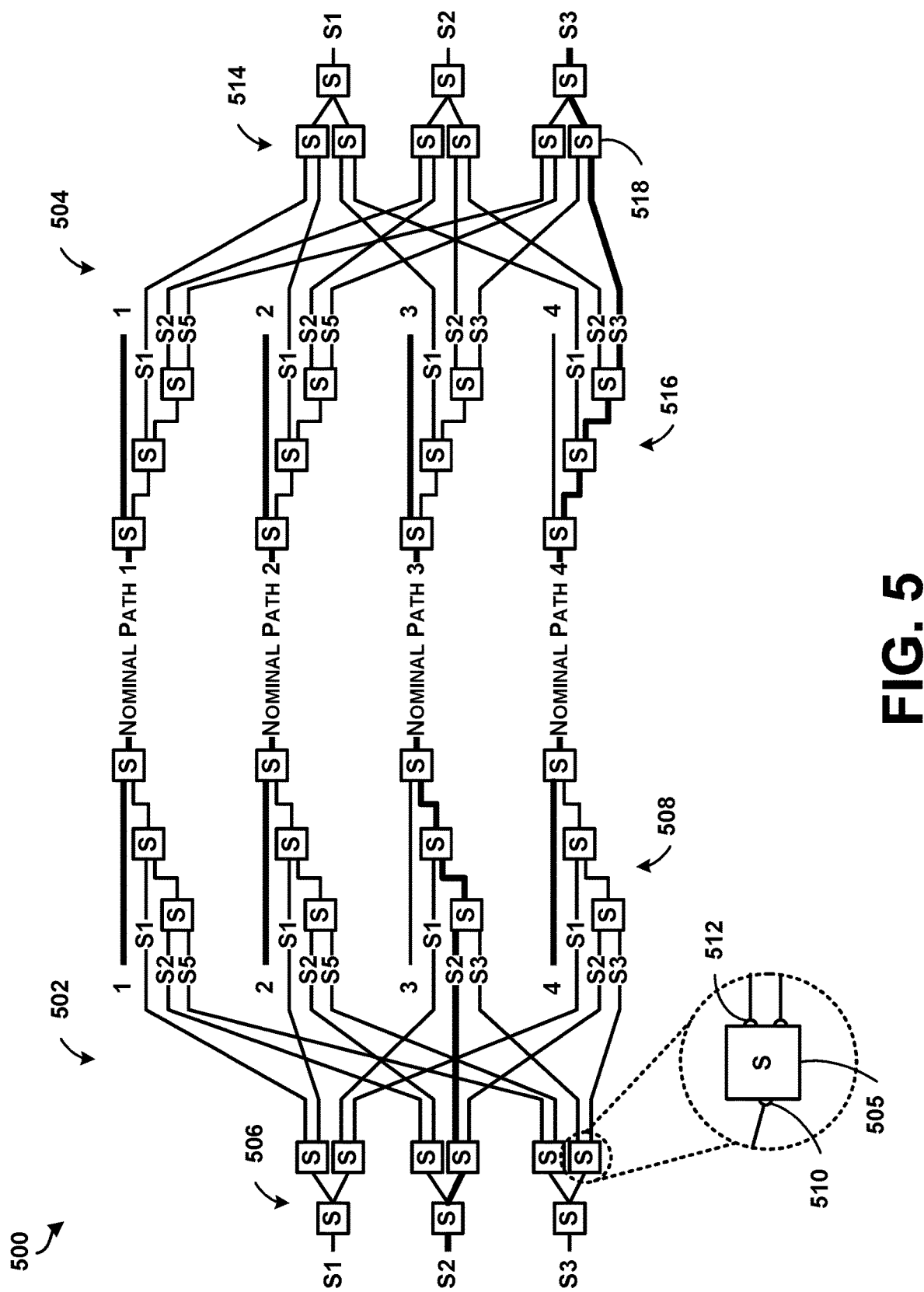
FIG. 5 illustrates an example controllable switching system, according to an example embodiment.

FIG. 5 illustrates an example controllable switching system 500. The controllable switching system 500 includes a controllable input switching system 502 as well as a controllable output switching system 504.

As shown in FIG. 5, the controllable input switching system 502 includes a first set of input switches 506 and a second set of input switches 508, with the first set of input switches 506 and the second set of input switches 508 arranged between three spare input RF paths S1, S2, S3 and four nominal RF paths. In the example arrangement of FIG. 5, each switch 505 of the first set of input switches 506 includes a single input port 510 and two output ports 512. Further, the switches 505 of the first set of input switches 506 are arranged in three groups of three switches, with each group connected to a respective spare input RF path. Each of the groups of three switches is cascade-connected in a fan-out topology. In particular, each group includes a first stage having a single switch, with the input port of the single switch connected to a corresponding spare input RF path. Each group also includes a second stage having two switches, with the two output ports of the single switch of the first stage connected to the respective input ports of the two switches of the second stage.

Each switch of the first set of input switches 506 is individually controllable and can be toggled between a first state in which the switch links its input port with a first output port and a second state in which the switch links its input port with a second output port. As such, each group of the first set of input switches 506 can selectively link a spare input RF path to any one of four different output ports.

The second set of input switches, in turn, includes four groups of three switches, with each group corresponding to one of the four nominal RF paths. Each switch of the second set of input switches 508 includes two input ports and a single output port. Each switch of the second set of input switches 508 is individually controllable and can be toggled between a first state in which the switch links its first input port with its output port and a second state in which the switch links its second input port with its output port. Depending on the state of the switches in each group of the second set of input switches 508, each group can selectively link a corresponding nominal RF path to one of the three groups of switches of the first set of input switches 506.

In FIG. 5, the bold lines represent the active or selected paths. For instance, on the input side, a first, second, and fourth primary input path are connected to a first, second, and fourth nominal RF path, respectively. Further, the second spare input RF path S2 is linked to a third nominal RF path.

One of ordinary skill in the art will appreciate that the number and arrangement of switches in the groups of the first set of input switches 506 can be modified to accommodate more or less nominal RF paths. Likewise, the number and arrangement of switches in the groups of the second set of input switches 508 can be modified to accommodate more or less spare input RF paths.

Similarly, the controllable output switching system 504 includes a first set of output switches 514 and a second set of output switches 516, with the first set of output switches 514 and the second set of output switches 516 arranged between three spare output RF paths S1, S2, S3 and the four nominal RF paths. In the example arrangement of FIG. 5, each switch 518 of the first set of output switches 514 includes two input ports and a single output port. Further, the switches of the first set of output switches 514 are arranged in three groups of three switches, with each group connected to a respective spare output RF path. Each of the groups of three switches is cascade-connected in a fan-in topology. In particular, each group includes a first stage having a single switch, with the output port of the single switch connected to a corresponding spare output RF path. Each group also includes a second stage having two switches, with the two input ports of the single switch of the first stage connected to the respective output ports of the two switches of the second stage.

Each switch of the first set of output switches 514 is individually controllable and can be toggled between a first state in which the switch links its first input port with its output port and a second state in which the switch links its second input port with its output port. As such, each group of the first set of output switches 514 can selectively link any one of four different inputs to a corresponding spare output RF path.

The second set of output switches 516, in turn, includes four groups of three switches, with each group corresponding to one of the four nominal RF paths. Each switch of the second set of output switches 516 includes one input port and two output ports. Each switch of the second set of output switches 516 is individually controllable and can be toggled between a first state in which the switch links its input port with a first output port and a second state in which the switch links its input port with a second output port. Depending on the state of the switches in each group of the second set of output switches 516, each group can selectively link a corresponding nominal RF path to one of the three groups of switches of the first set of output switches 514.

As indicated by the bold lines in FIG. 5, on the output side, the first, second, and third nominal RF paths are connected to a first, second, and third primary output path, respectively. Further, the fourth nominal RF path is linked to the third spare output RF path S3.

One of ordinary skill in the art will appreciate that the number and arrangement of switches in the groups of the first set of output switches 514 can be modified to accommodate more or less nominal RF paths. Likewise, the number and arrangement of switches in the groups of the second set of output switches 516 can be modified to accommodate more or less spare output RF paths.

Figure 6:
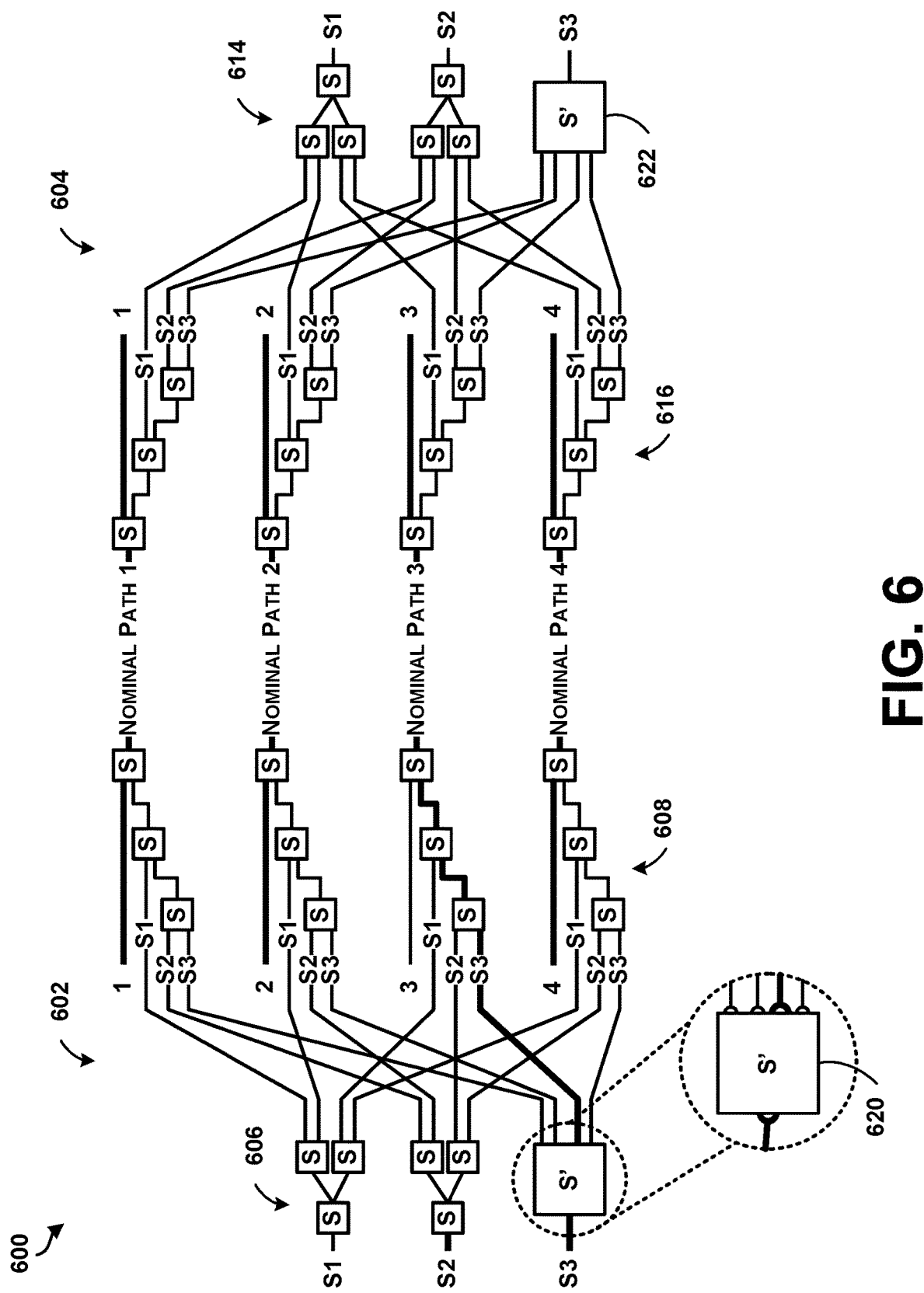
FIG. 6 illustrates another example controllable switching system, according to an example embodiment.

FIG. 6 illustrates another example controllable switching system 600. As in the controllable switching system 500 of FIG. 5, the controllable switching system 600 includes a controllable input switching system 602 as well as a controllable output switching system 604. In addition, the controllable input switching system 602 includes a first set of input switches 606 and a second set of input switches 608, while the controllable output switching system 604 includes a first set of output switches 614 and a second set of output switches 616.

The controllable switching system 600 of FIG. 6 differs from the controllable switching system 500 of FIG. 5, however, in that one of the groups of switches in the first set of input switches 606 is implemented with a one-to-many switch 620. The one-to-many switch 620 has one input port linked to a spare input RF path S3 and four different output ports. One of ordinary skill in the art will appreciate that other groups of switches in the first set of input switches 606 and/or groups of switches in the second set of output switches 616 may also be replaced with similar one-to-many switches.

The controllable switching system 600 of FIG. 6 also differs from the controllable switching system 500 of FIG. 5 in that one of the groups of switches in the first set of output switches 614 is implemented with a many-to-one switch 622. The many-to-one switch 622 has for input ports and a single output port. One of ordinary skill in the art will appreciate that other groups of switches in the first set of output switches 614 and/or groups of switches in the second set of output switches 616 may also be replaced with similar many-to-one switches.

Figure 7:
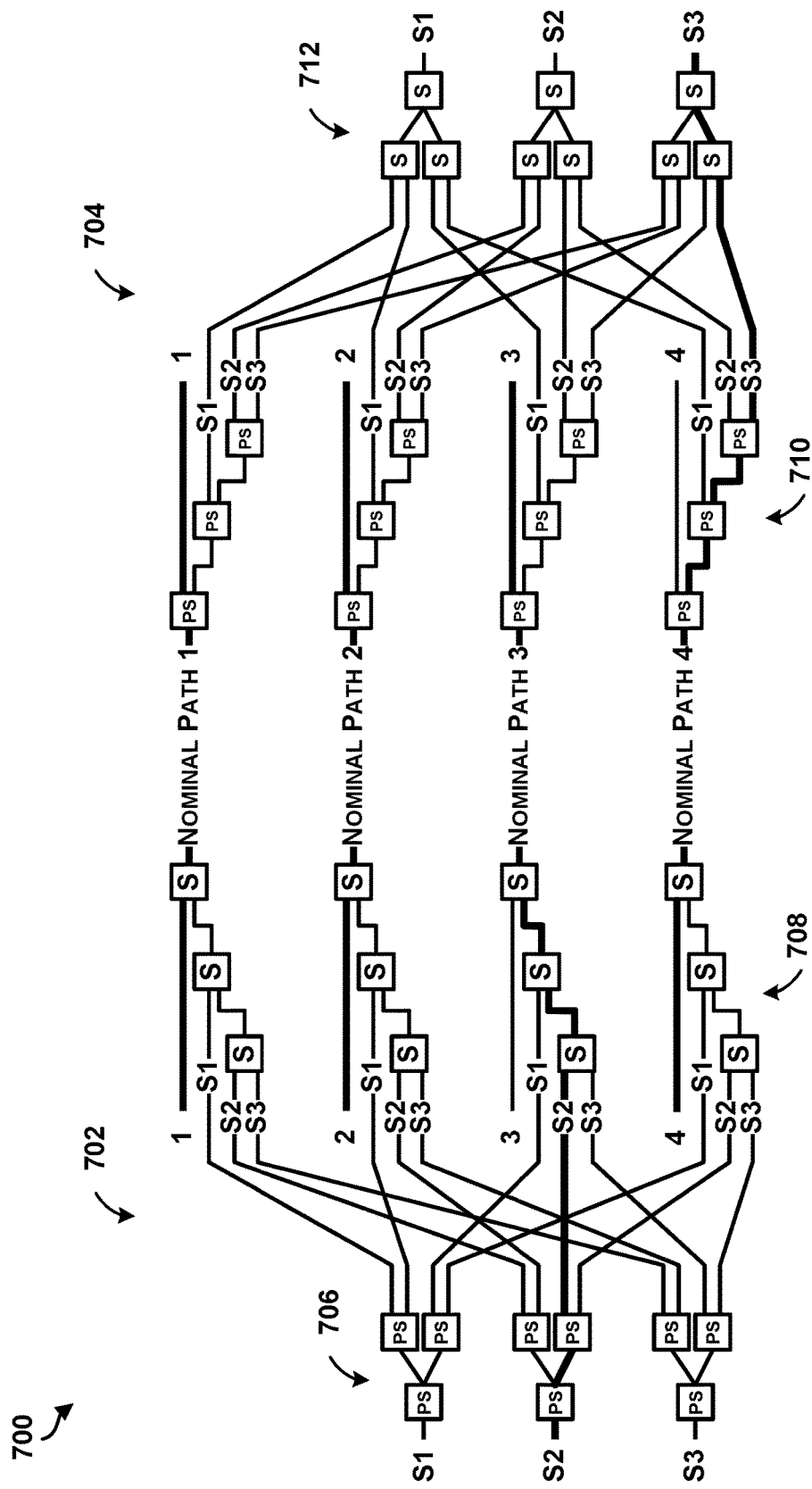
FIG. 7 illustrates still another example controllable switching system, according to an example embodiment.

FIG. 7 illustrates still another example controllable switching system 700. The controllable switching system 700 includes a controllable input switching system 702 and a controllable output switching system 704. The controllable input switching system 702, in turn, includes a set of input power splitters 706 and a set of input switches 708. And the controllable output switching system 704 includes a set of output power splitters 710 and a set of output switches 712.

In the example arrangement of FIG. 7, each power splitter of the set of input power splitters 706 includes a single input port and two output ports. Further, the power splitters of the set of input power splitters 706 are arranged in three separate groups, with each group connected to a respective spare input RF path. Each of the groups of power splitters is cascade-connected in a fan-out topology. In particular, each group includes a first stage having a single power splitter, with the input port of the single power splitter connected to a corresponding spare input RF path. Each group also includes a second stage having two power splitters, with the two output ports of the single power splitter of the first stage connected to the respective input ports of the two power splitters of the second stage. In operation, each power splitter divides the power of an RF signal received at its input port into two RF signals, and outputs the two RF signals at its two output ports, respectively. Thus, a spare input RF signal provided at an input port of the single power splitter of the first stage is split into four different RF signals.

In other examples, one or more of the power splitters of the set of input power splitters 706 may include a single input port and more than two output ports (not shown).

The set of input switches 708 includes four groups of three switches, with each group corresponding to one of the four nominal RF paths. Each switch of the set of input switches 708 includes two input ports and a single output port. Each switch of the set of input switches 708 is individually controllable and can be toggled between a first state in which the switch links its first input port with its output port and a second state in which the switch links its second input port with its output port. Depending on the state of the switches in each group of the second set of input switches 708, each group can selectively link a corresponding nominal RF path to one of the three groups of switches of the set of input power splitters 706.

In the example arrangement of FIG. 7, each power splitter of the set of output power splitters 710 also includes a single input port and two output ports. Further, the power splitters of the set of output power splitters 710 are arranged in four separate groups, with each group connected to a respective nominal RF path. In operation, each power splitter divides the power of an RF signal received at its input port into two RF signals, and outputs the two RF signals at its two output ports, respectively. Thus, an RF signal provided at an input port of a group of power splitters is split into four different RF signals.

In other examples, one or more of the power splitters of the set of output power splitters 710 may include a single input port and more than two output ports (not shown).

Each switch of the set of output switches 712 includes two input ports and a single output port. Further, the switches of the set of output switches 712 are arranged in three groups of three switches, with each group connected to a respective spare output RF path. Each of the groups of three switches is cascade-connected in a fan-in topology. In particular, each group includes a first stage having a single switch, with the output port of the single switch connected to a corresponding spare output RF path. Each group also includes a second stage having two switches, with the two input ports of the single switch of the first stage connected to the respective output ports of the two switches of the second stage.

Each switch of the set of output switches 712 is individually controllable and can be toggled between a first state in which the switch links its first input port with its output port and a second state in which the switch links its second input port with its output port. As such, each group of the set of output switches 712 can selectively link any one of four different inputs to a corresponding spare output RF path.

Figure 8:
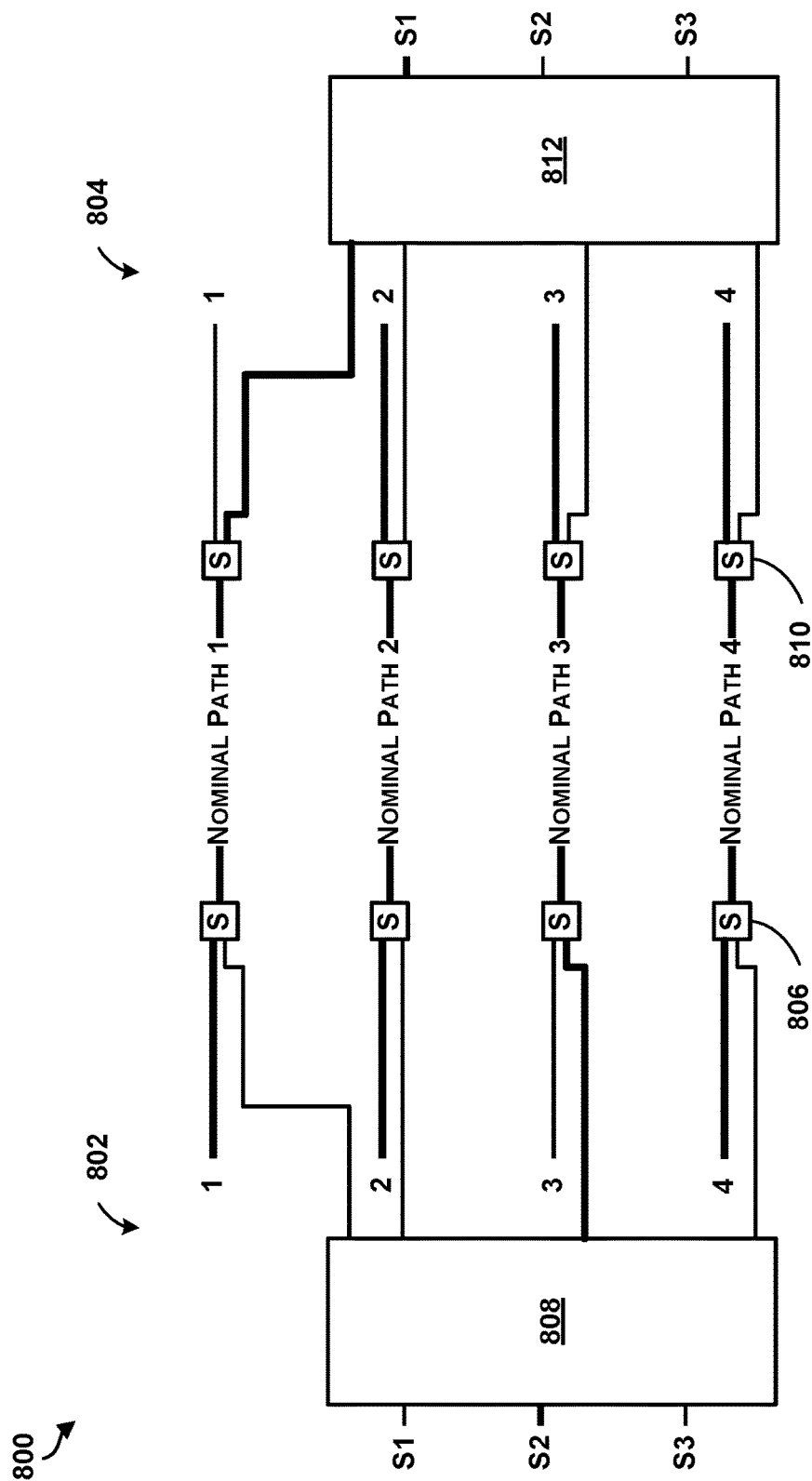
FIG. 8 illustrates still another example controllable switching system, according to an example embodiment.

FIG. 8 illustrates still another example controllable switching system 800. The controllable switching system includes a controllable input switching system 802 and a controllable output switching system 804. The controllable input switching system 802, in turn, includes four input switches 806 and an input RF switch matrix 808. And the controllable output switching system 804 includes four output switches 810 and an output RF switch matrix 812.

As shown in FIG. 8, each of the four input switches 806 is connected to a respective nominal RF path. Further, each input switch 806 includes two input ports and a single output port. Each input switch 806 is individually controllable and can be toggled between a first state in which the switch links its first input port with its output port and a second state in which the switch links its second input port with its output port.

The input RF switch matrix 808 has three inputs connected to three respective spare input RF paths and four outputs connected to the four nominal RF paths. In operation, the input RF switch matrix 808 can selectively link any one of the three inputs to any one of the four outputs. For example, as indicated by the bold lines in FIG. 8, the input RF switch matrix 808 may link a second spare input RF path to a third nominal RF path. The input RF switch matrix 808 may also simultaneously link a first spare input RF path and/or a third spare input RF path to any of the other nominal RF paths (not shown). In one example, the input RF switch matrix 808 may include a plurality of RF switches and signal conditioners that are mounted together in a mechanical infrastructure or housing. In another example, the input RF switch matrix 808 may be a solid-state switch matrix.

Each of the four output switches 810 is connected to a respective nominal RF path. Further, each output switch 810 includes a single input port and two output ports. Each output switch 810 is individually controllable and can be toggled between a first state in which the switch links its input port with a first output port and a second state in which the switch links its input port with a second output port.

The output RF switch matrix 812 has four inputs connected to the four respective nominal RF paths and three outputs connected to three respective spare output RF paths. In operation, the output RF switch matrix 812 can selectively link any one of the four inputs to any one of the three outputs. For example, as indicated by the bold lines in FIG. 8, the output RF switch matrix 812 may link the first nominal RF path to a first spare output RF path. The output RF switch matrix 812 may also simultaneously link the second, third, or fourth nominal paths to any of the other spare output RF paths (not shown). In one example, the output RF switch matrix 812 may include a plurality of RF switches and signal conditioners that are mounted together in a mechanical infrastructure or housing. In another example, the output RF switch matrix 812 may be a solid-state switch matrix.

Figure 9:
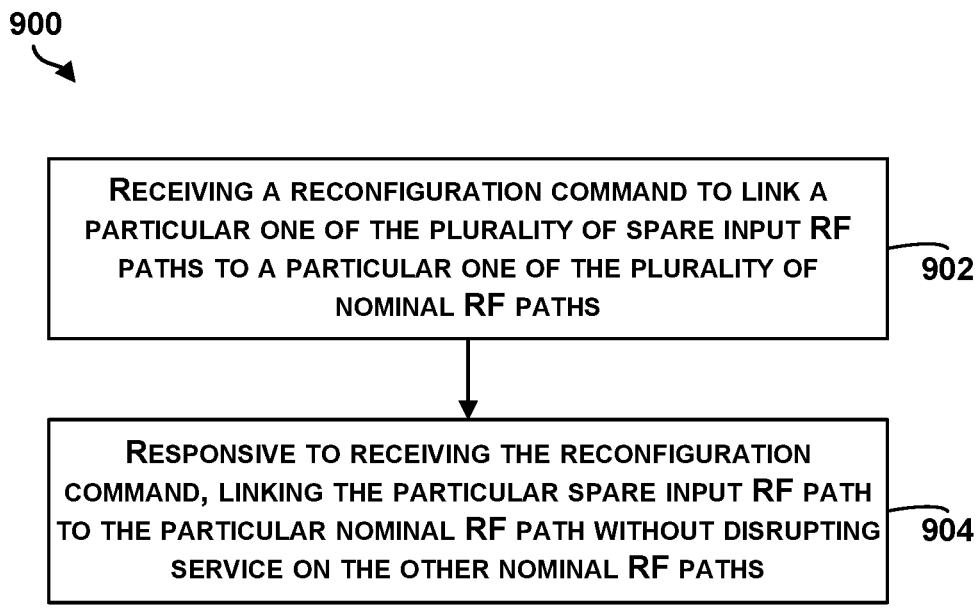
FIG. 9 shows a flowchart of an example method, according to an example embodiment.

FIG. 9 shows a flowchart of an example method 900 for injecting a spare input path signal into a nominal RF path. Method 900 shown in FIG. 9 presents an embodiment of a method that, for example, could be carried out by a controllable switching system of a communications system such as any of the controllable input switching systems described herein. For instance, the communications system may include a plurality of nominal RF paths configured to carry a respective primary RF signal from a respective primary input port to a respective primary output port. Further, the controllable switching system may be configured to selectively link any one of a plurality of spare input RF paths to any one of the plurality of nominal RF paths.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

Further, each block of this and other methods may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer readable media that stores data for short periods of time like register memory, processor cache, and RAM. The computer readable media may also be any other volatile or non-volatile storage systems. The computer readable medium may be considered a tangible computer readable storage medium, for example.

At block 902, the method 900 includes receiving a reconfiguration command to link a particular one of the plurality of spare input RF paths to a particular one of the plurality of nominal RF paths. And at block 904, the method 900 includes, responsive to receiving the reconfiguration command, linking the particular spare input RF path to the particular nominal RF path without disrupting service on the other nominal RF paths.

In line with the discussion above, the controllable switching system may include a plurality of individually controllable switches. Responsive to receiving the reconfiguration command, the state of one or more of the controllable switches may be toggled, such that an RF signal is permitted to flow from the particular spare input RF path to the particular nominal RF path. In one instance, the reconfiguration command may indicate the appropriate state of all of the controllable switches. In another instance, the reconfiguration command may indicate the appropriate state of one or more switches that are to be toggled.

Figure 10:
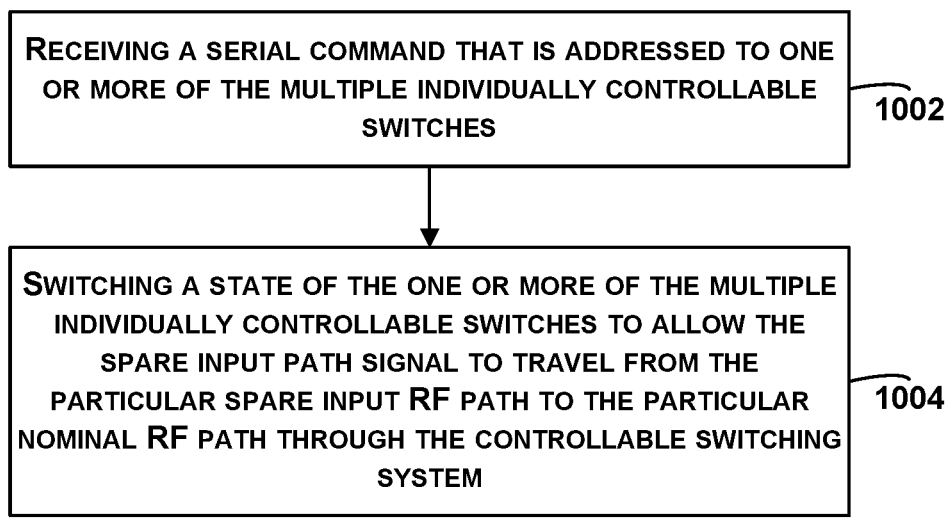
FIG. 10 shows a flowchart of another example method for use with the method shown in FIG. 9, according to an example embodiment.

FIG. 10 shows a flowchart of another example method for use with the method 900 shown in FIG. 9. In particular, FIG. 10 shows a flowchart of an example method that can be carried out when the controllable switching system includes multiple individually controllable switches. At block 1002, FIG. 10 includes receiving a serial command that is addressed to one or more of the multiple individually controllable switches. For instance, the serial command may be a message received via a serial communication interface. The message may include an address of a particular switch, or multiple addresses of multiple particular switches. At block 1004, FIG. 10 includes switching a state of the one or more of the multiple individually controllable switches to allow the spare input path signal to travel from the particular spare input RF path to the particular nominal RF path through the controllable switching system. By way of example, if the serial command includes a message having the address of a particular switch, the serial command can be received by the particular switch and interpreted by the particular switch as a command to toggle its state.

FIG. 11 shows a flowchart of an example method 1100 for accessing a spare output RF path. Method 1100 shown in FIG. 11 presents an embodiment of a method that, for example, could be carried out by a controllable switching system of a communications system, such as any of the controllable output switching systems described herein. For instance, the communications system may include a plurality of nominal RF paths configured to carry a respective primary RF signal from a respective primary input port to a respective primary output port. Further, the controllable switching system may be configured to selectively link any one of the plurality of nominal RF paths to any one of a plurality of spare output RF paths.

At block 1102, the method 1100 includes receiving a reconfiguration command to link a particular one of the plurality of nominal RF paths to a particular one of the plurality of spare output RF paths. And at block 1104, the method 1100 includes, responsive to receiving the reconfiguration command, linking the particular nominal RF path to the particular spare output RF path without disrupting service on the other nominal RF paths.

In line with the discussion above, the controllable switching system may include a plurality of individually controllable switches. Responsive to receiving the reconfiguration command, the state of one or more of the controllable switches may be toggled, such that an RF signal is permitted to flow from the particular nominal RF path to the particular spare output RF path. In one instance, the reconfiguration command may indicate the appropriate state of all of the controllable switches. In another instance, the reconfiguration command may indicate the appropriate state of one or more switches that are to be toggled.

FIG. 12 shows a flowchart of another example method for use with the method 1100 shown in FIG. 11. In particular, FIG. 12 shows a flowchart of an example method that can be carried out when the controllable switching system includes multiple individually controllable switches. At block 1202, FIG. 12 includes receiving a serial command that is addressed to one or more of the multiple individually controllable switches. For instance, the serial command may be a message received via a serial communication interface. The message may include an address of a particular switch, or multiple addresses of multiple particular switches. At block 1204, FIG. 12 includes switching a state of the one or more of the multiple individually controllable switches to allow the primary RF signal of the particular nominal RF path to travel from the particular nominal RF path to the particular spare output RF path through the controllable switching system. By way of example, if the serial command includes a message having the address of a particular switch, the serial command can be received by the particular switch and interpreted by the particular switch as a command to toggle its state.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:
1. A redundancy architecture (300, 400) for a communications system, comprising:
    a plurality of nominal radio frequency "RF" paths (302, 402), each of the plurality of nominal RF paths configured to carry a respective primary RF signal from a respective primary input port (304, 404) to a respective primary output port (306, 406);

a plurality of spare input RF paths (308, 408), each of the plurality of spare input RF paths configured to receive a respective spare RF signal from a respective spare input port (316, 416); and a controllable input switching system (312, 412, 502, 602, 702, 802) configured to selectively link any one of the plurality of spare input RF paths to any one of the plurality of nominal RF paths while avoiding disruption of service on the other nominal RF paths.

2. The redundancy architecture of claim 1, wherein the controllable input switching system comprises, for each of one or more of the plurality of spare input RF paths, multiple individually controllable switches (505) cascade-connected in a fan-out topology between the spare input RF path and each nominal RF path of the plurality of nominal RF paths.

3. The redundancy architecture of claim 2, wherein, for each of the one or more spare input RF paths, the multiple individually controllable switches cascade-connected in the fan-out topology comprise multiple individually controllable switches arranged in a succession of at least two stages.

4. The redundancy architecture of claim 2, wherein each of the multiple individually controllable switches comprises one input port (510) and multiple output ports (512).

5. The redundancy architecture of claim 1, wherein the controllable input switching system comprises, for each of one or more of the plurality of spare input RF paths, an individually controllable switch (620) having one input port linked to the spare input RF path and four different output ports, wherein each of the four different output ports is linked to a respective nominal RF path of the plurality of nominal RF paths.

6. The redundancy architecture of claim 1, wherein the controllable input switching system comprises an RF switch matrix (808) having at least as many inputs as a number of spare input RF paths in the plurality of spare input RF paths and at least as many outputs as a number of nominal RF paths in the plurality of nominal RF paths.

7. The redundancy architecture of claim 1, wherein the controllable input switching system comprises a serial communication interface (318, 418), and wherein the controllable input switching system is configured to selectively link a particular one of the plurality of spare input RF paths to a particular one of the plurality of nominal RF paths based on a serial command that is received via the serial communication interface.

8. The redundancy architecture of claim 1, wherein the controllable input switching system comprises a set of input power splitters (706) arranged in multiple groups, with each group of the multiple groups connected to a respective spare input RF path of the plurality of spare input RF paths.

9. A redundancy architecture (300, 400) for a communications system, comprising:

a plurality of nominal radio frequency "RF" paths (302, 402), each of the plurality of nominal RF paths configured to carry a respective primary RF signal from a respective primary input port (304, 404) to a respective primary output port (306, 406);

a plurality of spare output RF paths (310, 410), each of the plurality of spare output RF paths linked to a respective spare output port (320, 420); and a controllable output switching system (314, 414, 504, 604, 704, 804) configured to selectively link any one of the plurality of nominal RF paths to any one of the plurality of spare output RF paths while avoiding disruption of service on the other nominal RF paths.

10. The redundancy architecture of claim 9, wherein the controllable output switching system comprises, for each of one or more of the plurality of spare output RF paths, multiple individually controllable switches (518) cascade-connected in a fan-in topology between each nominal RF path of the plurality of nominal RF paths and the spare output RF path.

11. The redundancy architecture of claim 10, wherein, for each of the one or more spare output RF paths, the multiple individually controllable switches cascade-connected in the fan-in topology comprise multiple individually controllable switches arranged in a succession of at least two stages.

12. The redundancy architecture of claim 10, wherein each of the multiple individually controllable switches comprises multiple input ports and one output port.

13. The redundancy architecture of claim 9, wherein the controllable output switching system comprises, for each of one or more of the plurality of spare output RF paths, an individually controllable switch (622) having multiple input ports and one output port linked to the spare output RF path, wherein each of the multiple input ports is linked to a respective nominal RF path of the plurality of nominal RF paths.

14. The redundancy architecture of claim 9, wherein the controllable output switching systems comprises an RF switch matrix (812) having at least as many inputs as a number of nominal RF paths in the plurality of nominal RF paths and at least as many outputs as a number of spare output RF paths in the plurality of spare output RF paths.

15. The redundancy architecture of claim 9, wherein the controllable output switching system comprises a serial communication interface (322, 422), and wherein the controllable output switching system is configured to selectively link a particular one of the plurality of nominal RF paths to a particular one of the plurality of spare output RF paths based on a serial command that is received via the serial communication interface.

16. The redundancy architecture of claim 9, wherein the controllable output switching system comprises a set of output power splitters (710) arranged in multiple groups, with each group of the multiple groups connected to a respective nominal RF path of the plurality of nominal RF paths.

17. A redundancy architecture (300, 400) for a communications system, comprising:

a plurality of nominal radio frequency "RF" paths (302, 402), each of the plurality of nominal RF paths configured to carry a respective primary RF signal from a respective primary input port (304, 404) to a respective primary output port (306, 406);

a plurality of spare input RF paths (308, 408), each of the plurality of spare input RF paths configured to receive a respective spare RF signal from a respective spare input port (316, 416); and a controllable input switching system (312, 412, 502) configured to selectively link any one of the plurality of spare input RF paths to any one of the plurality of nominal RF paths, wherein the controllable input switching system comprises, for each of one or more of the plurality of spare input RF paths, multiple individually controllable switches (505) cascade-connected in a fan-out topology between the spare input RF path and each nominal RF path of the plurality of nominal RF paths.

18. The redundancy architecture of claim 17, wherein, for each of the one or more spare input RF paths, the multiple individually controllable switches cascade-connected in the fan-out topology comprise multiple individually controllable switches arranged in a succession of at least two stages.

19. The redundancy architecture of claim 17, wherein each of the multiple individually controllable switches comprises one input port (510) and two output ports (512).

20. The redundancy architecture of claim 17, wherein the controllable input switching system comprises a serial communication interface (318, 418), and wherein the controllable input switching system is configured to selectively link a particular one of the plurality of spare input RF paths to a particular one of the plurality of nominal RF paths based on a serial command that is received via the serial communication interface.

* * * * *